(12) United States Patent
Lambert et al.

(10) Patent No.: US 10,372,460 B2
(45) Date of Patent: Aug. 6, 2019

(54) SYSTEM AND METHOD FOR BASEBOARD MANAGEMENT CONTROLLER ASSISTED DYNAMIC EARLY HOST VIDEO ON SYSTEMS WITH A SECURITY CO-PROCESSOR

(71) Applicant: DELL PRODUCTS, LP, Round Rock, TX (US)

(72) Inventors: Timothy M. Lambert, Austin, TX (US); Jeffrey L. Kennedy, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 101 days.

(21) Appl. No.: 15/471,826

(22) Filed: Mar. 28, 2017

(65) Prior Publication Data
US 2018/0285121 A1 Oct. 4, 2018

(51) Int. Cl.
*G06F 9/4401* (2018.01)
*G06F 21/57* (2013.01)
*G06F 21/84* (2013.01)

(52) U.S. Cl.
CPC .......... *G06F 9/4405* (2013.01); *G06F 21/575* (2013.01); *G06F 21/84* (2013.01)

(58) Field of Classification Search
CPC ............................ G06F 9/4401; G06F 21/575
See application file for complete search history.

(56) References Cited

U.S. PATENT DOCUMENTS

| | | | |
|---|---|---|---|
| 2006/0294358 A1* | 12/2006 | Wang | G06F 9/4406 713/2 |
| 2008/0059626 A1 | 3/2008 | Campbell et al. | |
| 2011/0283098 A1* | 11/2011 | Gillespie | G06F 9/4401 713/2 |
| 2013/0265328 A1 | 10/2013 | Lambert et al. | |
| 2015/0268874 A1* | 9/2015 | Bollandoor | G06F 3/0619 711/103 |
| 2016/0062772 A1* | 3/2016 | Sakaida | G06F 9/4401 713/2 |

* cited by examiner

*Primary Examiner* — Austin Hicks
(74) *Attorney, Agent, or Firm* — Larson Newman, LLP

(57) ABSTRACT

An information handling system includes a data processor, a security co-processor, and a baseboard management controller (BMC). The security co-processor operates during a first in time portion of a boot process of the information handling system. The BMC provides first video display content during the first in time portion of the boot process. The data processor provides second video display content during a second in time portion of the boot process.

20 Claims, 3 Drawing Sheets

SYSTEM AND METHOD FOR BASEBOARD MANAGEMENT CONTROLLER ASSISTED DYNAMIC EARLY HOST VIDEO ON SYSTEMS WITH A SECURITY CO-PROCESSOR

FIELD OF THE DISCLOSURE

This disclosure generally relates to information handling systems, and more particularly relates to baseboard management controller assisted dynamic early host video on systems with a security co-processor.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a data processor, a security co-processor, and a baseboard management controller (BMC). The security co-processor may operate during a first in time portion of a boot process of the information handling system. The BMC may provide first video display content during the first in time portion of the boot process. The data processor may provide second video display content during a second in time portion of the boot process.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
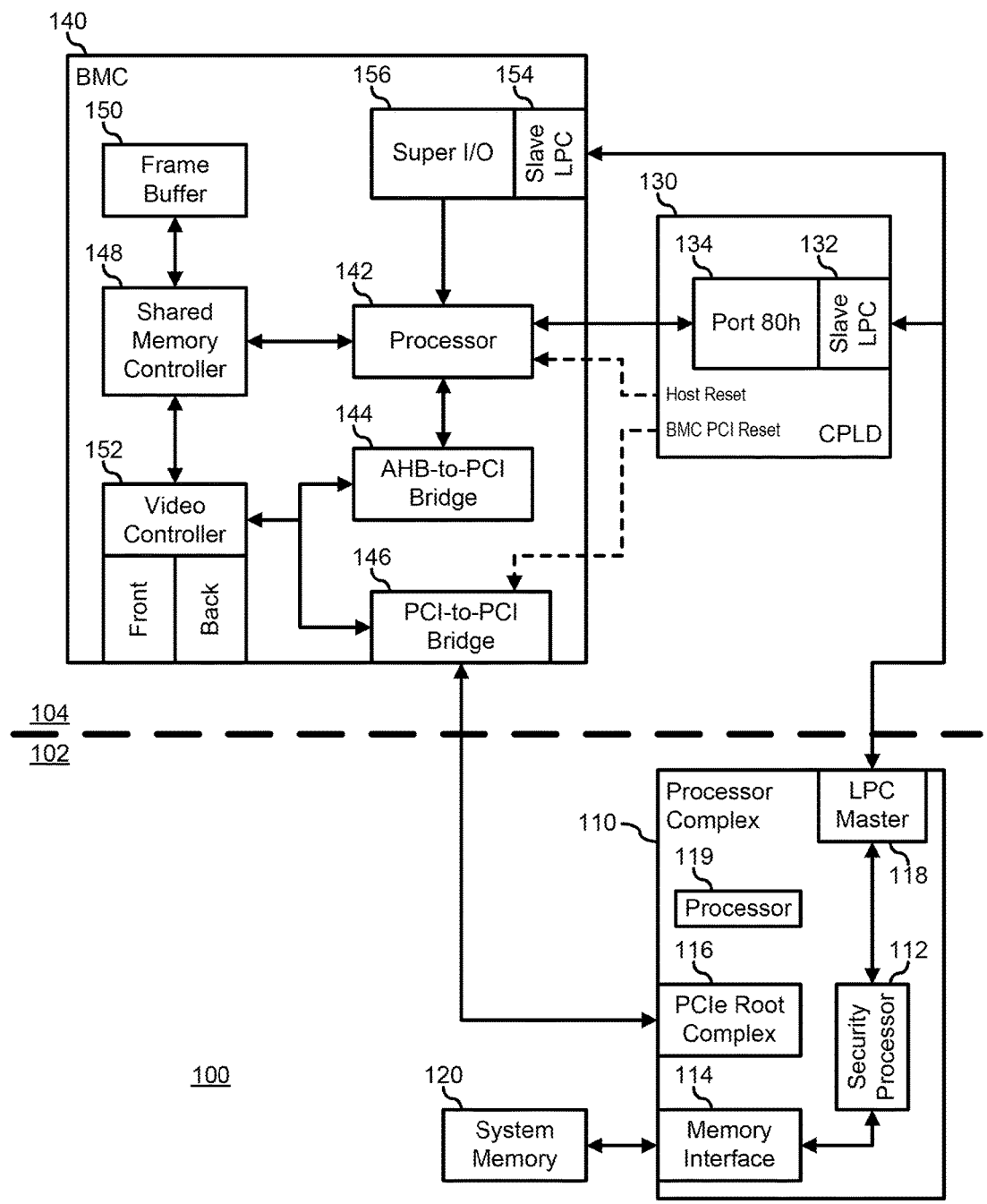
FIG. 1 is a block diagram illustrating an information system according to an embodiment of the present disclosure.

FIG. 1 illustrates an information handling system 100. For purpose of this disclosure information handling system 100 can be configured to provide the features and to perform the functions of the system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 includes a host environment 102 and a management environment 104. Host environment includes a processor complex 110 and a system memory device 120. Processor complex 110 includes a security co-processor 112, a memory interface 114, a Peripheral Component Interconnect—Express (PCIe) root complex 116, a Low Pin Count (LPC) master interface 118, and one or more Central Processing Units (CPU) 119. Management environment 104 includes a Complex Programmable Logic Device (CPLD) 130, and a Baseboard Management Controller 140. CPLD 130 includes a slave LPC interface 132 that is configured to capture system boot progress, or Power On Self Test (POST), information at, for example, a port 80$h$ 134 of information handling system 100. BMC 140 includes a processor 142, an Advanced High-Performance Bus (AHB)-to-PCI bridge 144, a PCI-to-PCI bridge 146, a shared memory controller 148, a video frame buffer 150, a video controller 152, a LPC slave interface 154 that is configured to communicate with a super I/O 156 of an I/O hub of processor complex 110. An example of security co-processor 112 includes an Intel processor with Hardware Assisted Security, an AMD processor with a Platform Security Processor (PSP), or the like. An example of BMC 140 includes a commercially available BMC product that operates in accordance with an Intelligent Platform Management Initiative (IPMI) specification, such as a Integrated Dell Remote Access Controller (iDRAC), or the like. Note that, as illustrated, BMC 140 includes frame buffer 150, but this is not necessarily so, and the frame buffer can represent a memory element outside of the BMC, such as a portion of a memory device associated with management environment 104, as needed or desired.

Host environment 102 operates to provide data processing functionality of information handling system 100, such as is typically associated with information handling system 100. Processor complex 110 represents a data processing apparatus, such as one or more microprocessors or processor cores, and the associated data input and output I/O functionality that, execute machine-executable code to perform the data processing tasks associated with information handling system 100. Security co-processor 112 represents a processing resource of processor complex 110 that operates to offload various functions related to system, data, and computing assurance and security. In a particular embodiment, security co-processor 112 represents a separate processing device of processor complex 110. In another embodiment, security co-processor 112 is integrated with CPU 119. In either case, security co-processor 112 provides particular value to the assurance and security of information handling system 100 during the boot process of the information handling system. In particular, security co-processor 112 provides image verification for the system BIOS or UEFI code prior to launching the system BIOS or UEFI code to boot information handling system 100. Additionally, security co-processor 112 provides image verification for device firmware code prior to handing off control of the associated devices. Further, security co-processor 112 provides image verification for application software code prior to launching the software, and for other code as needed or desired. The mechanisms and methods of image verification are known in the art and are beyond the scope of the present disclosure.

Management environment 104 operates to implement and manage various maintenance, operation, and system update processes for information handling system 100 that are not typically associated with the data processing functionality of the information handling system. For example, management environment 104 may provide for out-of-band management of the various code executed on host environment 102, such as BIOS code or UEFI code, firmware code, programs, applications, operating systems, and the like. In particular, management environment 104 can operate on a different power plane than host environment 102, such that the management environment can download and store updated code for the host environment, even when the host environment is powered off. Management environment 104 also operates to monitor and maintain the functions and features of information handling system 100 that are not necessarily associated with the data processing operations performed by host environment 102, such as system thermal and cooling management, fan speed adjustment, power supply monitoring and adjustment, and the like. The mechanisms and method of system management via a BMC are known in the art and are beyond the scope of the present disclosure.

During the system boot process of information handling system 100, security co-processor 112 operates to perform initialization of system memory 120. For example, security co-processor 112 can initialize a south bridge element of processor complex 110 to make a System Management Bus (SMBus) accessible, can read Serial Presence Detect (SPD) information related to the types of memory modules that are installed in information handling system 100, and can configure a north bridge element of the processor complex to access the memory modules in the correct way, as specified by the SPD information. Further, security co-processor 112 operates during the boot process to perform self-testing and predictive self-healing of the memory modules of system memory 120. Moreover, security co-processor 112 operates during the boot process of information handling system 100 to direct a Non-Volatile Dual In-Line Memory Module (NVDIMM) to perform a memory restore operation to restore previously saved information from a non-volatile memory device of the NVDIMM to a Dynamic Random Access Memory (DRAM) device of the NVDIMM. The mechanisms and methods of memory initialization, memory self-testing, predictive self-healing, and NVDIMM restore operations are known in the art and are beyond the scope of the present disclosure Further, during the system boot process of information handling system 100, the system BIOS or UEFI operates to discover and identify any PCI-based interfaces on the information handling system, to determine if any system components are connected to the PCI-based interfaces, and to initialize the system components that are connected to the PCI-based interfaces. As such, the system BIOS or UEFI discovers and identifies PCIe root complex 114, discovers PCI-to-PCI bridge 146 connected to the PCIe root complex, and discovers AHB-to-PCI bridge 144 and video controller 152 connected to the PCI-to-PCI bridge. Upon discovering video controller 152, the system BIOS or UEFI operates to initialize the video controller, thereby enabling information handling system 100 to display information on a display device that is connected to a front display port or a back display port of the video controller.

However, during the system boot process, security co-processor 112 is released from a reset condition prior to the releasing CPU 119 from the reset condition. In this way, security co-processor 112 can insure that the code to be executed by processor complex 110 is safe, and has not been tampered with. The reset condition for CPU 119 is further maintained while security co-processor 112 performs the memory related activities, as described above. However, other activities of the system boot process that are associated with the execution of the system BIOS code or the UEFI code are blocked from being performed by CPU 119 because the resent condition remains asserted to the CPU while security co-processor 112 performs the code assurance and memory initialization activities, and such activities cannot be started until after the CPU is released from the reset and the CPU begins to execute code.

In particular, because CPU 119 is held in reset, any PCIe devices, including PCIe root complex 114, PCI-to-PCI bridge 146, AHB-to-PCI bridge 144, and video controller 152, are not enumerated and set up for normal operations, and so no information is able to be provided by a video subsystem of information handling system 100 until after the CPU is released from the reset condition. Further, the system boot progress, or POST, information from system BIOS or UEFI that is typically presented at port 80h 134 will not be available until long after CPU 119 is released from the reset condition. However, the activities performed by security co-processor 112 prior to the releasing of CPU 119 from the reset condition may require an extended amount of time. For example, where system memory 120 represents a large memory space, such as above 1 terabyte (TB) for server systems, memory initialization may take seconds to perform, and memory self-testing and memory self-healing may take additional minutes to perform. Further, where system memory 120 represents a large capacity of NVDIMMs, the NVDIMM restore operations may take further additional minutes to perform. Moreover, during the whole time that CPU 119 is held in the resent condition, that is, the time during which the system BIOS or UEFI is not executing, the system BIOS or UEFI is unable to provide any video based information or POST information.

However, such a long duration of time, within which a user of information handling system 100 is provided no indication that the information handling system is actually doing anything, may be unacceptable. For example, having received no indication that information handling system 100 is actually booting and that security co-processor 112 is performing normally, a user may mistakenly believe that the system as crashed, and may reboot the information handling system, resulting in the same dearth of feedback that the information handling system is booting normally. It is for this reason that manufacturers of information handling systems similar to information handling system 100 typically require that, during a boot process of the information handling system, some level of video display information, including boot progress information derived from the POST information, be displayed within one second of the initialization of the boot process.

In a particular embodiment, management environment 104 operates to determine when security co-processor 112 is in a system boot process execution mode, and to display video information on a display device that is connected to a front display port or a back display port of video controller 152 while the security co-processor is in the system boot process execution mode. Here, BMC 140, and in particular processor 142, detects when host environment 102 is powered on and released from reset via a host reset signal received from CPLD 130. Processor 142 further determines that security co-processor 112 is operating in the system boot process execution mode. For example, security co-processor 112 can provide status and progress information for the activities performed during the system boot process on port 80h 134. Here, BMC 140 can include a map of POST codes as provided by security co-processor 112 and as provided by the system BIOS or UEFI, and the BMC can distinguish between the security co-processor provided POST codes and the BIOS or UEFI provided POST codes. Further, BMC 140 can determine when security co-processor 112 hands execution off to CPU 119. For example, security co-processor 112 can provide a particular POST code on port 80h 134 that indicates that the security co-processor has handed execution off to CPU 119. In another embodiment, BMC 140 determines when security co-processor 112 hands execution off to CPU 119 by receiving the particular POST code on super I/O 156.

Here, when security co-processor 112 provides POST information to port 80h 134, CPLD 120 operates to latch the information and provide the information to processor 142. Processor 142 implements a memory map that includes the security co-processor POST codes, that maps the POST codes to descriptors for the POST codes. In this way, BMC 140 maintains an awareness of the operating state of security co-processor 112. CPLD 130 also operates to detect the POST code from security co-processor 112 that indicates that the security co-processor has handed execution off to CPU 119, and, upon detecting the hand off POST code, disables the delivery of the information from port 80h 134 to processor 142. Further, when CPLD 130 detects that a platform reset has been initiated, that is, when security co-processor 112 performs a next system boot process, the CPLD rearms the delivery of the information from port 80h 134 to processor 142.

When BMC 140 determines that the host reset signal has been sent from CPLD 130, and that the POST information received from port 80h 134 is associated with the system boot process execution mode by security co-processor 112, then processor 142 operates to initialize video controller 152 via AHB-to-PCI bridge 144. Then processor 142 copies splash screen information from a memory device associated with management environment 102 to frame buffer 150 and directs video controller 152 to provide the information from the frame buffer to a display device that is connected to a front display port or a back display port of the video controller. In this way, even though security co-processor 112 is in the system boot execution mode, information handling system 100 is still able to meet a manufacturer's requirement to provide display information within 1 second of powering on the information handling system. In addition, as CPLD 130 provides the POST information from port 80h 134 to processor 142, the processor determines a message that correlates with the received POST codes and modifies the contents of frame buffer 150 to provide a portion of the display that gives status information on the progress of the system boot process under the control of security co-processor 112. In a particular embodiment, CPLD 130 provides the POST information to processor 142 as the POST information is received. In another embodiment, CPLD 130 provides an interrupt to processor 142 when the POST information is received.

Finally, when the system BIOS or UEFI code begins to execute, when security co-processor has handed execution off to CPU 119 of processor complex 110, the system BIOS or UEFI directs CPLD 130 to issue a BMC PCI reset signal to BMC 140 to reset PCI-to-PCI bridge 146, to clear frame buffer 150, and to reinitialize video controller 152 so that the normal display operations can be resumed under system BIOS or UEFI control.

Figure 2:
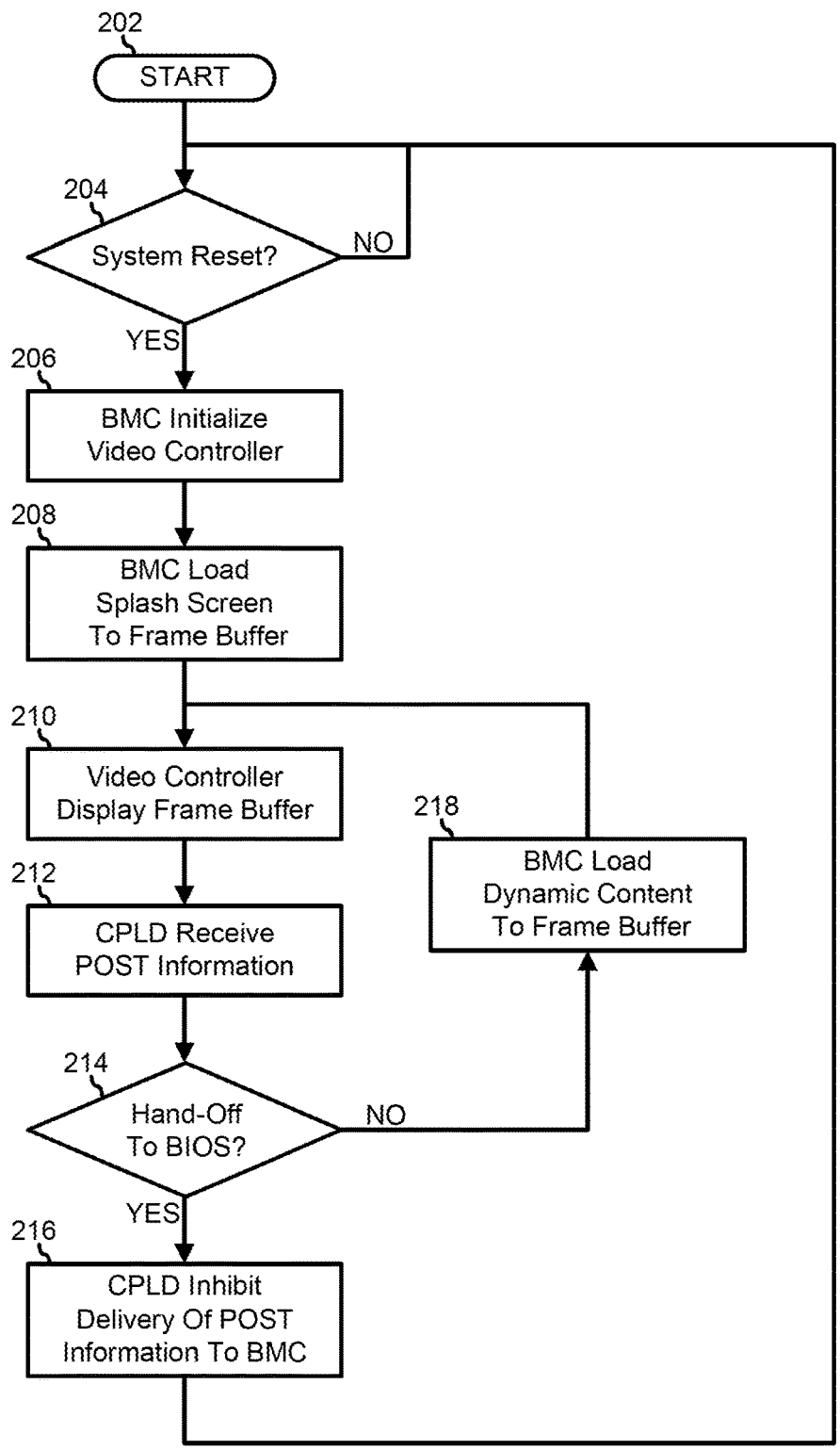
FIG. 2 is a flowchart illustrating a method for baseboard management controller assisted dynamic early host video on systems with a security co-processor according to an embodiment of the present disclosure.

FIG. 2 illustrates a method for baseboard management controller assisted dynamic early host video on systems with a security co-processor, starting at block 202. A decision is made as to whether or not a system reset has occurred in decision block 204. For example, BMC 140 can receive a reset signal from CPLD 130 indicating that information handling system 100 is in a system reset process, that security co-processor 112 is operating in the system boot process mode, and that CPU 119 is not executing system BIOS or UEFI code. If a system reset has not occurred, the "NO" branch of decision block 204 is taken and the method loops at decision block 204 until a system reset has occurred. When the system reset occurs, the "YES" branch of decision block 204 is taken and a BMC initializes a video controller of the BMC in block 206 and loads a splash screen from a memory of the BMC to a frame buffer in block 208.

A video controller of the BMC displays the contents of the frame buffer on a display port in block 210. A CPLD receives POST information on a port 80h in block 212, and a decision is made as to whether or not the POST information indicates that a security co-processor has handed off execution of the system boot process to a CPU for execution of system BIOS or UEFI code in decision block 214. If not, the "NO" branch of decision block 218 is taken, the BMC receives the POST information from the CPLD, maps the POST information to a status string, or dynamic content, and loads the status string to the frame buffer in block 218, and the method returns to block 210 where the video controller displays the contents of the frame buffer on the display port. If the POST information indicates that the security co-processor has handed off execution of the system boot process to the CPU for execution of system BIOS or UEFI code, the "YES" branch of decision block 214 is taken, the CPLD inhibits delivery of the POST information to the BMC in block 216, and the method returns to block 204 where a decision is made as to whether or not another system reset has occurred.

Figure 3:
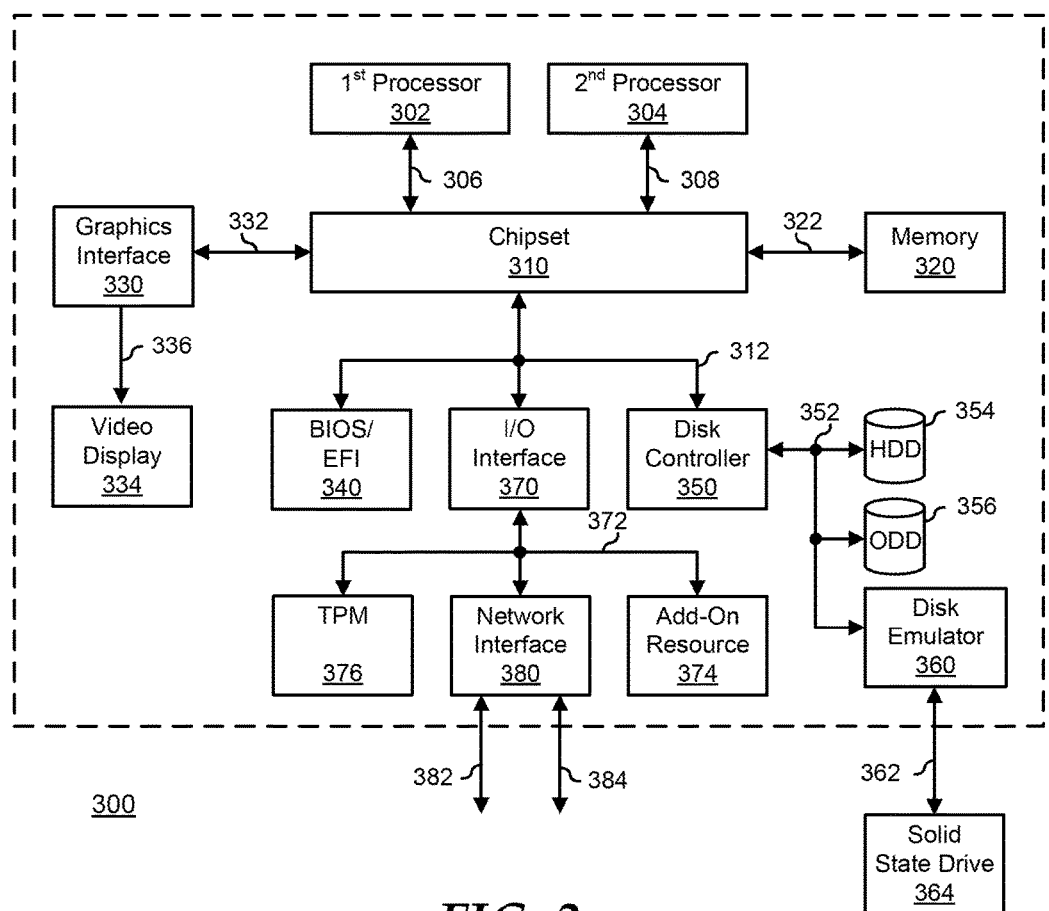
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a data processor;
a security co-processor; and
a baseboard management controller (BMC);
wherein:
the security co-processor operates during a first in time portion of a boot process of the information handling system, the first in time portion of the boot process being prior to the launch of a Basic Input/Output System (BIOS) of the information handling system;
the BMC provides first video display content during the first in time portion of the boot process; and
the data processor provides second video display content during a second in time portion of the boot process, the second in time portion of the boot process being during execution of the BIOS.

2. The information handling system of claim 1, wherein the first video content comprises static image information and dynamic image information.

3. The information handling system of claim 2, wherein the dynamic image information includes first information associated with a first step of the first in time portion of the boot process.

4. The information handling system of claim 3, wherein the dynamic image information changes to include second information associated with a second step of the first in time portion of the boot process.

5. The information handling system of claim 3, wherein the security co-processor provides first status information to the BMC related to the first particular step.

6. The information handling system of claim 1, wherein, prior to providing the first video display content, the BMC initializes a video controller of the BMC.

7. The information handling system of claim 6, wherein, prior to providing the second video display content, the data processor reinitializes the video controller.

8. The information handling system of claim 1, wherein the data processor does not operate during the first in time portion of the boot process.

9. A method, comprising:
operating a security co-processor of an information handling system during a first in time portion of a boot process of the information handling system, the first in time portion of the boot process being prior to the launch of a Basic Input/Output System (BIOS) of the information handling system;
providing, by a baseboard management controller (BMC) of the information handling system, first video display content during the first in time portion of the boot process;
operating a data processor of the information handling system during a second in time portion of the boot process, the second in time portion of the boot process being during execution of the BIOS; and
providing, by the data processor, second video display content during a second in time portion of the boot process.

10. The method of claim 9, wherein the first video content comprises static image information and dynamic image information.

11. The method of claim 10, wherein the dynamic image information includes first information associated with a first step of the first in time portion of the boot process.

12. The method of claim 11, further comprising:
changing, by the BMC, the dynamic image information changes to include second information associated with a second step of the first in time portion of the boot process.

13. The method of claim 11, further comprising:
providing, by the security co-processor, first status information to the BMC related to the first particular step.

14. The method of claim 9, further comprising:
initializing, by the BMC, a video controller of the BMC prior to providing the first video display content.

15. The method of claim 14, further comprising:
reinitializing, by the data processor, the video controller, prior to providing the second video display content.

16. The method of claim 9, wherein the data processor does not operate during the first in time portion of the boot process.

17. A baseboard management controller (BMC), comprising:
a processor; and
a video controller;
wherein the processor:
receives a system reset for an information handling system that includes the BMC;
determines that a co-processor of the information handling system is executing a first in time portion of a system boot process, the first in time portion of the boot process being prior to the launch of a Basic Input/Output System (BIOS) of the information handling system;
initializes the video controller in response to determining that the co-processor is executing the first in time portion of a system boot process;
provides first video display content to the video controller during the first in time portion of the boot process;
determines that a data processor of the information handling system is executing a second in time portion of the system boot process; and releases the video controller to be controlled by the data processor during a second in time portion of the boot process, the second in time portion of the boot process being during execution of the BIOS.

18. The BMC of claim 17, wherein the first video content comprises static image information and dynamic image information.

19. The BMC of claim 18, wherein the dynamic image information includes first information associated with a first step of the first in time portion of the boot process.

20. The BMC of claim 19, wherein the dynamic image information changes to include second information associated with a second step of the first in time portion of the boot process.

* * * * *